United States Patent
Happel

[15] 3,667,167
[45] June 6, 1972

[54] WORK DRIVING DEVICE FOR AUTOMATIC CAMSHAFT GRINDING MACHINE

[72] Inventor: William Emory Happel, Waynesboro, Pa.
[73] Assignee: Landis Tool Company
[22] Filed: Jan. 26, 1971
[21] Appl. No.: 109,770

[52] U.S. Cl. ....................................................... 51/215 H
[51] Int. Cl. ........................................................ B24b 47/02
[58] Field of Search ..................... 51/237 CS, 215 RH, 101 R

[56] References Cited
UNITED STATES PATENTS

| | | | |
|---|---|---|---|
| 2,940,227 | 6/1960 | Flohr | 51/237 CS |
| 2,950,586 | 8/1960 | Smith | 51/237 CS |
| 3,006,118 | 10/1961 | Fournier | 51/237 CS |
| 3,028,020 | 4/1962 | Peras | 51/215 R X |
| 3,579,914 | 5/1971 | Price | 51/101 R |
| 3,585,763 | 6/1971 | Clark | 51/237 CS |
| 3,601,927 | 8/1971 | Kikuchi | 51/215 R |

Primary Examiner—Othell M. Simpson
Attorney—David S. Urey

[57] ABSTRACT

A work driving apparatus for a machine tool, such as a cam contour grinding machine, for applying a driving torque against two spaced angular points through end portion (57) and a carbide block (64), to rotate the workpiece with minimal radial displacement. A driving block (41) is hinged to a face plate (28) to enable the driving block (41) to compensate for size variations of the workpiece and to insure concentricity with the periphery of the workpiece (W), such as an automotive camshaft. Rotation of the work driving device (26) automatically angularly orients the workpiece relative, for example, to a master cam (19), as work rest pressure restrains rotation of the workpiece. This allows an automatic work loader to be used without any devices to regulate the angular position of the workpiece.

5 Claims, 5 Drawing Figures

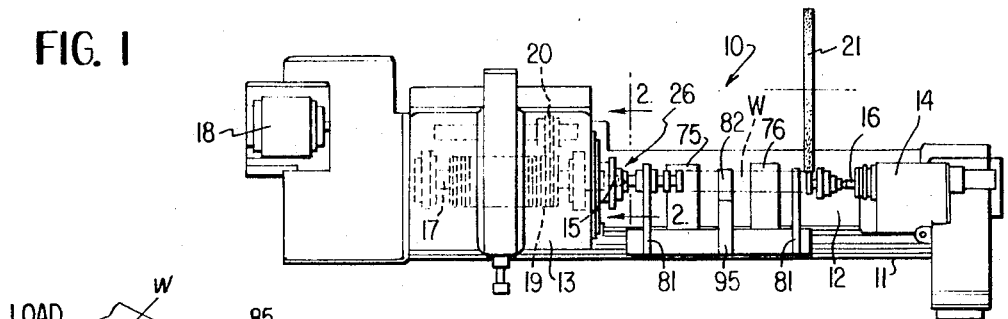
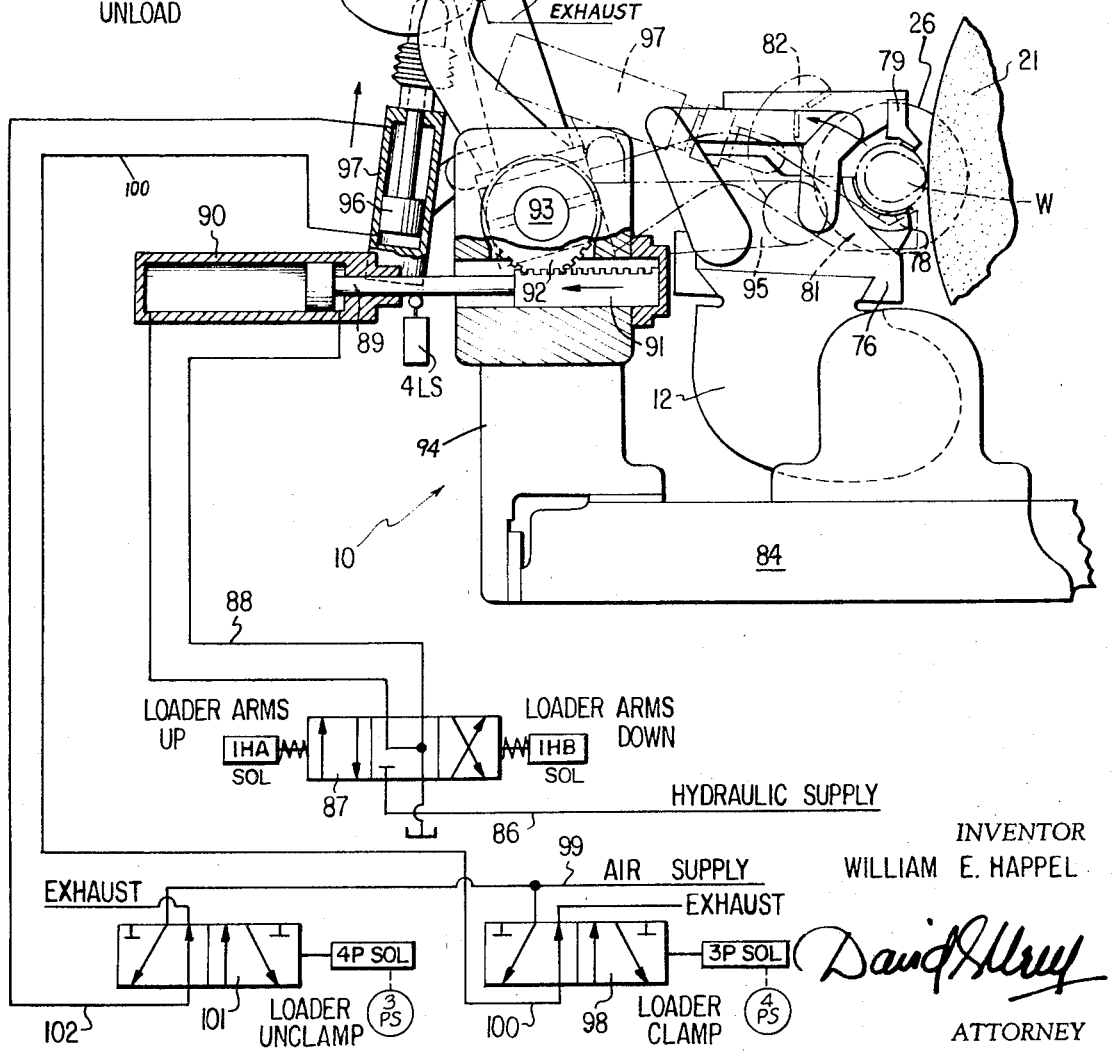

INVENTOR
WILLIAM E. HAPPEL

BY
ATTORNEY

WORK DRIVING DEVICE FOR AUTOMATIC CAMSHAFT GRINDING MACHINE

BACKGROUND OF THE INVENTION

1. Field of the Invention

This invention relates to new and useful improvements in work driving devices for driving workpieces for a machining operation, and more particularly, a work driving device for use on an automatic camshaft grinder for driving a camshaft during the grinding of cam contours thereof.

The work driving device is particularly adapted for use in orienting and driving a workpiece, such as a camshaft having an extended portion or key which is substantially used for securing a cam gear or sprocket to the camshaft.

This invention has particular application on automatic cam contour grinders and enables an automatic loader to be used. The loader places the workpieces on the conventional work rests in any random angular orientation. Friction from the jaw shoes of the work rests is used to restrain rotation of the camshaft while the work driving device is rotated at a slow speed to orient the cam contours relative to the headstock spindle and the master cam. Driving pressure is obtained through a floating, hingedly mounted work driver which transmits a substantially pure driving torque to rotate the workpiece.

The work driving device may be used to drive any cylindrical workpiece from a positive angular position automatically which enables an automatic work loader to be used.

2. Description of the Prior Art

Prior to this invention, the means for driving a camshaft consisted of a removable fixture which was placed on each camshaft before placing it in a cam grinding machine. This fixture was removed from the camshaft after the grinding operation. The fixture cooperated with a driving dog on a face plate of a cam grinding apparatus to rotate the camshaft. In this type of arrangement, the application of the driving force to rotate the camshaft applied a radial force which had a tendency to cause radial displacement of the camshaft.

In more recent applications, such as U.S. Ser. No. 744,349, now U.S. Pat. No. 3,585,763 granted June 22, 1971 and U.S. Ser. No. 744,350, now U.S. Pat. No. 3,579,914, granted May 25, 1971 a work driving device was formed as part of a camshaft grinding apparatus. This enabled a camshaft to be engaged manually in an oriented relation and driven in a manner wherein the problem of radial displacement was eliminated by applying a driving torque at two angularly spaced points on a workpiece when the headstock spindle rotates a floating work driver. The camshaft in each of these inventions includes a radially offset orienting hole or a keyway, which allows an indexing element to rotate the camshaft in a precise oriented position relative to the master cam. This method is satisfactory for manual machines, but would not enable an automatic work loader to be used, because the camshaft has to be engaged in an oriented relationship manually.

SUMMARY OF THE INVENTION

In accordance with the invention, the work driver is used to rotate a workpiece in a machine tool, such as a camshaft in a cam grinder. The workpiece is provided with a locating and driving projection, such as a key. The machine includes conventional means for rotating and supporting the workpiece between work centers while the workpiece is supported on work rests. The work driver includes a floating driving block having opposed work engaging surfaces. The block is hingedly or floatingly mounted so that the work engaging surfaces can adjust to variances in the periphery of the workpiece. The block also includes indexing means which initially will receive the workpiece in any angular position and subsequently will locate the workpiece projection or key in a single angular position with respect to the rotating means. The indexing means forms one driving surface against the key and one of the work engaging surfaces forms another to apply a mechanical couple, which is substantially free of forces which tend to shift the workpiece radially relative to the work centers. The workpieces may be automatically loaded onto the work rests in random angular positions. One of the work centers is advanced to move the workpiece into the work driver and against the other work center. The work rests restrain the rotation of the workpiece while the work driver is slowly rotated to locate the key in the indexing means, whereafter a machining operation is performed.

In the preferred embodiment, the indexing means includes a pair of pivotally mounted, opposed fingers which are spaced to engage opposite sides of the key. The fingers are resiliently urged into the engaging position, but they can pivot away therefrom when the workpiece is initially advanced into the work driving device if the key strikes either of the fingers.

It is, therefore, an object of the present invention to provide a work driving device which enables a workpiece to be received in a random angular orientation, and thereafter be oriented in the device automatically to one specific angular position.

A further object of this invention is to provide a work driving device which applies nearly pure torque or turning forces to the workpiece with minimal radial forces, that is, minimal forces which tend to move the workpiece radially relative to the work centers.

Another object of this invention is to provide a novel work driving device for a camshaft grinding apparatus wherein means are provided to load the camshaft in a random angular relationship to the driver and to rotate the headstock spindle at a slow rate, while restraining the workpiece, until the workpiece is angularly oriented.

Another object of this invention is to control rotation of the camshaft in a manner which will enable the cam lobe contours to be followed by the grinding wheel with a constant driving pressure from the work driver, without any backlash or overdriving when the trailing side of the cam lobe passes the grinding wheel.

Another object of this invention is to provide a novel work driving device for a camshaft grinding apparatus wherein the work driving device utilizes a protruding key from a conventional keyway in the camshaft both for the automatic orienting of the camshaft and the driving thereof.

Another object of this invention is to provide a novel work driving device which includes a driving block which is free to float radially to a central position a limited amount to compensate for size variations of the workpieces, and to ensure concentricity between the driving block and the periphery of the workpiece.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a plan view of a camshaft grinding apparatus in which the work driving device is utilized;

FIG. 5 is a partial side elevation view of the grinding machine and shows a typical swinging arm-type loader, and the schematic hydraulic controls which allow workpieces to be automatically loaded into the machine.

DESCRIPTION OF THE PREFERRED EMBODIMENTS

Figure 2:
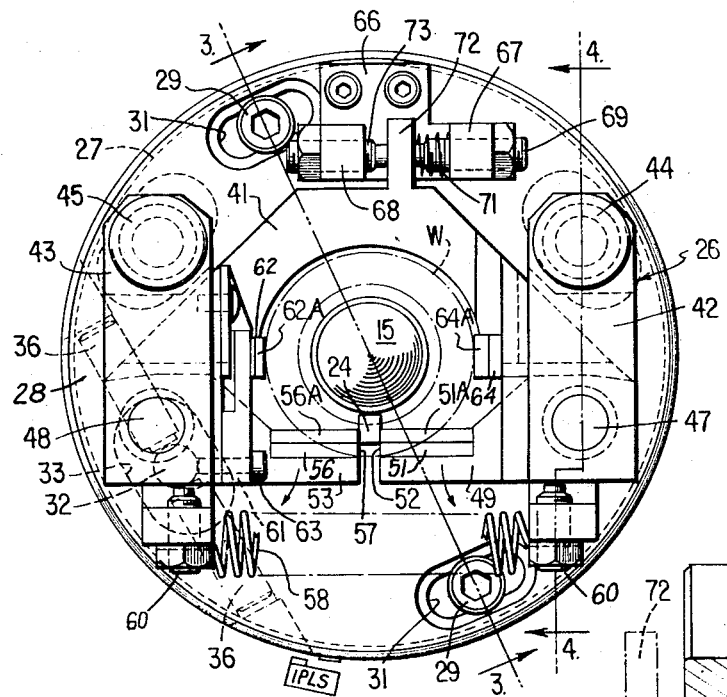
FIG. 2 is an enlarged fragmentary transverse sectional view taken along the line 2—2 of FIG. 1, and shows the work driving device in elevation.

Referring now to the drawings in detail, there are illustrated in FIG. 1, the basic components of a conventional camshaft grinder, which is generally referred to by the numeral 10. The invention has application to other machine tools, but will be described herein, by way of example, as it is used on a camshaft grinder.

The camshaft grinder 10 includes a base 11 on which there is mounted a cradle 12 for imparting a rocking movement to the workpiece W. At opposite ends of the cradle 12, there are mounted a headstock 13 and a tailstock 14. The headstock 13 includes a work center 15, and the tailstock 14 includes a work center 16. A camshaft or other workpiece W to be ground is mounted for rotation on the work centers 15 and 16 on a longitudinal axis determined by the work centers.

The headstock 13 also includes a spindle 17, which is driven by means of a motor 18. The spindle 17 has mounted thereon for rotation therewith a master cam 19. The master cam 19 is engaged by a follower 20 to effect rocking of the cradle 12 in timed relation to the rotation of the workpiece W so as to produce the desired cam contour thereon. The camshaft grinder 10 includes a grinding wheel 21 which is mounted in a conventional manner for selected engagement with the lobes of the camshaft or workpiece W.

Figure 3:
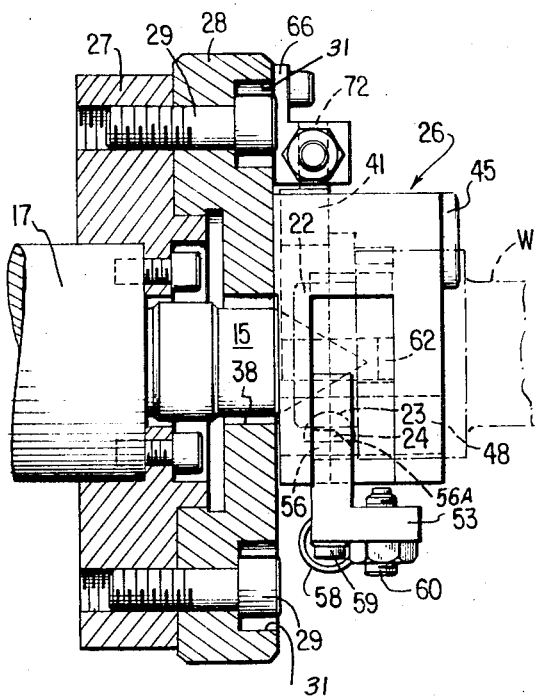
FIG. 3 is a fragmentary axial sectional view taken along the line 3—3 of FIG. 3.

Reference is now made to FIGS. 2 and 3 in particular, wherein there is illustrated a workpiece W to be ground. The illustrated workpiece W is a camshaft of which only a front portion thereof is illustrated. The camshaft has an end portion 22 of a diameter smaller than the heel diameter of the cam lobes. When the camshaft is finally completed and read for assembly into a motor, the end portion 22 normally has positioned thereon a cam gear or sprocket (not shown) for driving the camshaft. In order to couple such a cam gear or sprocket to the camshaft in an oriented relation, the end portion 22 is provided with a keyway 23 in which an indexing element or key 24 of the conventional type will normally be seated. It is this key 24 which is utilized in the orienting and driving of the camshaft or workpiece W.

In order to couple the camshaft or workpiece W to a conventional cam grinding apparatus in an oriented relation with respect to the master cam thereof and for rotation therewith, the camshaft grinder 10 (FIG. 1) is provided with a work driving device 26 which is best shown in FIG. 2. Referring now to FIG. 1, the work driving device 26 is mounted on the spindle 17 in a generally concentric relationship with respect to the work center 15. The work driving device 26 includes an adapter 27 which is secured to the spindle 17 for rotation therewith and in a predetermined oriented relationship with respect to the master cam 19. The adapter 27 has secured thereto a driver head or face plate 28 by means of a pair of circumferentially spaced screws 29—29. It is to be noted that the screws 29—29 pass through slotted openings 31—31 in the face plate 28, so that a minor adjustment in a circumferential direction may be obtained between the face plate 28 and the adapter 27.

Referring now to FIGS. 2 and 3 in particular, it will be seen that the adjustment of the face plate 28 relative to the adapter 27 is accomplished by providing the adapter 27 with a forwardly extending pin 32 which projects into a recess 33 formed in the rear side of the face plate 28. The face plate 28 is machined to carry opposed positioning or adjusting screws 36—36 on opposite sides of the recess 33. The screws 36—36 engage the opposite sides of the pin 32 and are adjustable to vary the angular position of the face plate 28, when the screws 29—29 are loosened.

Figure 4:
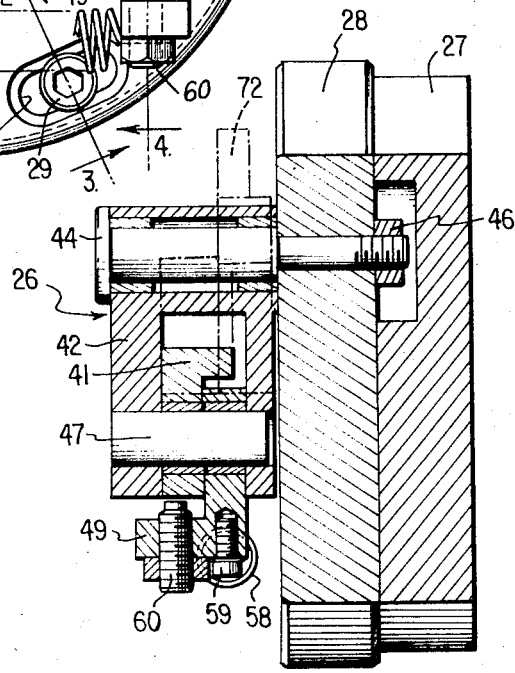
FIG. 4 is a fragmentary axial sectional view taken along the line 4—4 of FIG. 2.

The face plate 28 is provided with a central opening 38 through which the work center 15 projects. A driving block or floating member 41 is connected to the face plate 28 for rotation therewith and for effecting rotation of an associated workpiece W. The floating member 41 includes a right-hand (R.H.) and a left-hand (L.H.) link, 42 and 43, respectively, as shown in FIGS. 2, 3, and 4. The R.H. and L.H. links 42 and 43 are pivotally mounted on pivot pins 44 and 45, which are mounted on the face plate 28 in an angular spaced relation and secured by fasteners 46—46.

The ends of the R.H. and L.H. links 42 and 43 remote from the pivot pins 44 and 45, are bifurcated and are provided with studs 47 and 48 respectively, which are secured thereto. An R.H. indexing member or finger 49 is pivotably mounted on the stud 47 and includes a carbide block 51 having a beveled edge 51A on the upper portion to facilitate entrance of the end portion 22 of the workpiece W. The carbide block 51 includes an end portion 52 which is retained against the R.H. side of the key 24 when a workpiece W is in the oriented position. An L.H. indexing member or finger 53 is pivotally mounted about the stud 48 and includes a carbide block 56 having a beveled edge 56A on the upper portion to facilitate entrance of the end portion 22 of the workpiece W. The carbide block 56 includes an end portion 57 which is retained against the L.H. side of the key 24 when a workpiece W is in the oriented position. The R.H. finger 49 and the L.H. finger 53 are retained in the closed or work engaging position by a tension spring 58 which is secured to the lower portion of the R.H. and L.H. fingers 49 and 53 respectively, through spring retainers 59—59 as shown in FIGS. 3 and 4. It is to be understood that the tension of the spring 58 is such that it may be readily overcome to permit the counterclockwise pivoting of the R.H. finger 49 or the clockwise pivoting of the L.H. finger 53 as shown by the arrows in FIG. 2. The pivotable movement of the R.H. or L.H. fingers 49 and 53 occurs when the key 24 engages one of the carbide blocks 51 or 56 when the camshaft or workpiece W is being axially shifted into the work driving device 26 during the loading operation.

Set screws 60—60 are secured and locked in an extended portion of the R.H. and L.H. fingers 49 and 53 to limit the upward movement of the R.H. and L.H. fingers 49 and 53.

A support block 61 (FIG. 2), which includes a carbide block 62, is secured to the left-hand surface of the floating member 41 through a fastener 63. The carbide block 62 includes a beveled edge 62A, and the thickness of the carbide block 62 is machined to provide a slight amount of deflection when in contact with the workpiece W to retain the workpiece W against a carbide block 64, which is formed on the right-hand surface of the floating member 41.

A stop block 66 having bifurcated portions 67 and 68 is secured to the outer surface of the face plate 28 at a position which is arcuately spaced midway between the pivot pins 44 and 45. A set screw 69 is secured and locked to the portion 67 and carries a compression spring 71 to retain a projection 72 of the floating member 41 against a set screw 73 which is secured and locked to the portion 68. The spring 71 urges the floating member 41 to the left (FIG. 2) of the loading range, which enables the workpiece W to contact the carbide block 64 during the loading of the workpiece W. This arrangement will prevent undue strain against the spring-loaded carbide block 62 when a workpiece W is loaded. Adjustment of the screws 69 and 73 control the total amount of radial movement of the floating member 41 to provide a range of movement to allow the work driving device 26 to compensate for size variations of the workpiece W, and to insure concentricity between the floating member 41 and the periphery of the workpiece W.

A pair of hydraulically operated work rests 75 and 76 (FIGS. 1 and 5) are secured to the rocking work cradle 12 to align the lower work rest shoes 78—78 with the main bearing diameters of the workpiece W. The upper work rest shoes 79—79 are hydraulically advanced to prevent rotation of the workpiece W, while the work driving device 26 is rotated at a slow speed to orient the workpiece W relative to the headstock spindle 17. A typical work rest is disclosed in U.S. application, Ser. No. 839,924, now U.S. Pat. No. 3,591,988, granted July 13, 1971, and does not form a part of this invention. This arrangement allows unground workpieces to be loaded by an automatic loader 80 which places the workpiece W on the lower work rest shoes 78—78 by the clockwise movement of loader arms 81—81 (FIG. 5). This movement is effected after a clamp member 82 is advanced to provide a holding force between the workpiece W and the loader arms 81—81 at the start of the loading operation. The workpiece W may be loaded in a horizontal position without being concerned with angular position of the key 24. The workpiece W is unclamped, and the hydraulic tailstock 14 advances the workpiece W axially into the work driver 26 and against the headstock center 15. The upper work rest shoes 79—79 are then advanced by hydraulic pressure and the workpiece W is restrained against rotation to allow the work driving device 26 to orient the workpiece W relative to the headstock spindle 17. A carriage 84 is traversed to the right in a conventional manner to align the grinding wheel 21 with the first portion of the workpiece W to be ground, the grinding wheel 21 will be advanced in a transverse direction, and the headstock motor 18 will rotate the workpiece W at a high speed for the grinding operation.

OPERATION

With particular reference to FIG. 5, it is to be understood that the operation of the automatic loader 80 and the work driving device 26 may be operated either automatically or by manual pushbutton controls (not shown).

The workpieces W are automatically loaded into the camshaft grinding machine 10 by clockwise movement of the loader arms 81 which carry a workpiece W from a loader magazine 85 to the lower work rest shoes 78—78. This movement is effected by the hydraulic system which directs a source of fluid pressure from a line 86 through a control valve 87, to a line 88, when the solenoid 1HB SOL is energized, which shifts the valve 87 to the left against spring pressure. Fluid pressure from the line 88 moves a piston rod 89 of a hydraulic motor or cylinder 90 to the left (FIG. 5). A rack member 91, which is secured to the piston rod 89, rotates a pinion gear 92 in mesh with the rack member 91.

The pinion gear 92 is secured to a shaft 93 which is rotatably housed in a loader mounting bracket 94 which is secured to the carriage 84. Rotation of the pinion gear 92 rotates the shaft 93 and the loader arms 81—81 are lowered in a clockwise direction which places the workpiece W on the work rest shoes 78—78. A clamp arm 95 is also secured to the shaft 93 and is repositioned clockwise by the movement of the rack member 91.

The loader arms 81—81 are not advanced until the clamp member 82 has gripped the workpiece W. This occurs when fluid or pneumatic pressure is applied to advance a piston 96 of a hydraulic motor or cylinder 97, which is secured to the clamp arm 95. This movement is effected by the energization of the solenoid 3P SOL, which occurs at the start of the cycle after a timed interval which allows a workpiece W to be released from the loader magazine 85. The energization of the solenoid 3P SOL shifts a valve 98 to the left (FIG. 5). Pneumatic pressure is directed from a line 99, through the valve 98 and to the head end of the cylinder 97, through a line 100. The piston 96 advances the clamp member 82 to provide a holding force between the workpiece W and the loader arms 81—81 to maintain positive control of the workpiece W during the loading operation. A pressure switch 4PS is actuated by pneumatic pressure directed from a shaft 83, through an opening 83A, when the clamp member 82 is completely closed. The actuation of the switch 4PS effects energization of the solenoid 1HP SOL, and the loader arms 81—81 are lowered.

A limit switch 4LS is actuated when the loader arms 81—81 are in the lowered position by contact, for example, with the rack member 91. The actuation of the limit switch 4LS effects the deenergization of the solenoid 1HB SOL, and the control valve 87 is shifted to the right by spring pressure. The actuation of the limit switch 4LS also energizes a relay (not shown) which deenergizes the solenoid 3P SOL, and the valve 98 is shifted to the right by spring pressure. The solenoid 4P SOL is energized, which effects the unclamping of the clamp member 82. The energization of the solenoid 4P SOL shifts a control valve 101 to the left, and pneumatic pressure is directed from the line 99, through the valve 101, to a line 102. The line 102 directs pneumatic pressure to the rod end of the cylinder 97, which retracts the piston 96 and the clamp member 82 releases the workpiece W. A pressure switch 3PS is actuated by pneumatic pressure directed from the shaft 83, through an opening 83B when the clamp member 82 is completely opened. The actuation of the pressure switch 3PS effects the energization of a tailstock advance solenoid (not shown).

The tailstock work center 16 is then advanced by hydraulic pressure to move the workpiece W axially into the work driving device 26 and against the headstock center 15. The upper work rest shoes 79—79 are advanced by hydraulic pressure to restrain the workpiece W from rotation. A pressure switch (not shown) is energized once the upper work rest shoes 79—79 are in the clamping position. The work driving device 26 (FIG. 2) is then rotated clockwise at a slow speed to orient the workpiece W in relation to the headstock spindle 17 and the master cam 19. The normal tendency of the workpiece W to rotate by friction between the work centers 15 and 16 is overcome by the pressure exerted by the work rest shoes 78—78 and 79—79.

The headstock motor 18 rotates the spindle 17 and the work driving device 26 at a slow speed. Rotation of the work driving device 26 is in a counterclockwise direction (FIG. 2), and with the workpiece W restrained against rotation, the key 24 will normally contact the upper surface of the carbide block 51 of the R.H. finger 49. The R.H. finger 49 will pivot counterclockwise about the stud 47 as the pressure from the tension spring 58 is overcome. The left-hand side of the key 24 will contact the end portion 57 of the L.H. finger 53 and the R.H. finger 49 will return to its original position as shown in FIG. 2. Clearance between the key 24 and the surfaces end of the portions 52 and 57 is substantially non-existent when the R.H. or L.H. fingers 49 and 53 are returned to their original position as shown in FIG. 2. In the event the key 24 engages the carbide block 56 when the workpiece W is originally advanced into the work driving device 26, the above sequence is the same except that the carbide block 56 is initially pivoted in a clockwise direction prior to rotation of the work driving device 26.

The end portion 22 of the camshaft or workpiece W is in tangential contact with the carbide blocks 62 and 64, which aligns the R.H. and L.H. links 42 and 43 about the pivot pins 44 and 45. The floating member 41 is properly oriented from the periphery of the workpiece W, depending on the size variance of the end portion 22 of the camshaft or workpiece W.

Rotation of the face plate 28 effects rotation of the work driving device 26 which results in the end portion 57 of the carbide block 56 providing a turning force against the key 24 to rotate the workpiece W. The carbide block 64 is in contact with the end portion 22 of the camshaft or workpiece W to provide true rotation around the axis of the camshaft or workpiece W, without applying a force which would effect radial displacement.

It is to be understood that the work driving device 26 properly orients the workpiece W angularly relative to the master cam 19. Also, because of the circumferentially spaced points of driving engagement between the end portion 57 of the carbide block 56 and the carbide block 64 which acts as a heel against the workpiece W, the force applied to the workpiece W will be a couple, comprising solely rotational forces. There will be substantially no radial force components which would tend to shift the workpiece W radially relative to the work centers 15 and 16. A plugging switch 1PLS is energized during slow rotation of the headstock spindle 17, which effects traverse of the carriage 84 to the right until the first cam lobe to be ground is in axial alignment with the grinding wheel 21. The grinding wheel 21 is advanced and the headstock spindle 17 is not rotated at high speed in a conventional manner. It should be noted that the lack of clearance between the surfaces 52 and 57 insures a constant driving pressure from the work driving device 26, without any backlash or over-driving when the trailing side of the cam lobe passes the grinding wheel 21.

A driving pin (not shown) secured to the end of the workpiece W could be used to provide means to orient the camshaft in an identical manner. The clearance between the end portions of the carbide blocks 51 and 56 would be machined to just clear the diameter of the pin and the key 24 would, of course, be omitted.

Although only a preferred embodiment of the work driving device 26 has been specifically illustrated and described, it is to be understood that minor variations may be made in the work driving device without departing from the spirit of the invention.

I claim:

1. In a machine tool for removing material from a workpiece, the workpiece having a projecting indexing element or key, the machine including a tool, a headstock and a tailstock for rotatably supporting the workpiece, at least one work rest for supporting the workpiece, the improvement comprising:
a work driver which includes:
a floating driving block having opposed work engaging surfaces,
means for hingedly mounting said work driver so that the work engaging surfaces adjust to variances in the periphery of the workpiece,
said floating driving block further including indexing means for enabling a workpiece to be automatically loaded in a random angularly oriented position,
said indexing means also forming one driving surface against said key and one of said work driver surfaces forming another driving surfaces against the workpiece periphery to provide a mechanical couple;
an automatic work loader for transferring unground workpieces to said work rest;
means for shifting the work center of the tailstock longitudinally to move the workpiece axially into driving engagement with said work driver and said headstock work center; and
means for restraining rotation of said workpiece and simultaneously slowly rotating the work driver to orient the workpiece in said indexing means relative to a headstock.

2. In an automatic grinding machine for grinding axially spaced cam lobes of an automotive camshaft, the camshaft having a projecting indexing element or key, the machine including a base, a grinding wheel support on said base, a grinding wheel rotatably mounted on said wheel support, a work support comprising a carriage slidably mounted on said base, a rocking work cradle pivotably mounted to said carriage, a headstock and a tailstock on said cradle for rotatably supporting a workpiece, a master cam on said headstock having cam contours for each cam lobe on the camshaft, a master cam follower, a pair of work rests which are secured to said cradle to support two spaced bearing diameters of the camshaft, the improvement comprising:
an automatic work loader for transferring unground camshafts to said work rests;
work driver means for receiving a camshaft in a random angularly oriented position from the work loader;
said work driver including indexing means for engaging and driving the camshaft by said key;
means for shifting the work center of the tailstock longitudinally to move the camshaft axially into driving engagement with said work driver and said headstock work center; and
means for restraining rotation of said camshaft and simultaneously slowly rotating the work driver to orient the key in said indexing means relative to said master cam.

3. An automatic grinding machine as recited in claim 2, wherein said work driver comprises:
a driving head having a pair of spaced protruding pins extending therefrom;
a link pivotally mounted on each of said pins,
said links extending in generally parallel directions, and having studs extending from the free end thereof;
a floating member secured between said studs for limited radial movement about said pins;
a finger pivotally mounted on each of said studs,
the ends of said fingers being held apart a distance substantially equal to the width of the key when the fingers are co-axially aligned toward each other about the studs by said floating member;
means for resiliently urging said fingers into co-axial alignment to engage the key on two sides; and
means on said floating member for engaging opposite sides of the camshaft to position the floating member concentrically with the periphery of the camshaft, one of said fingers and one of said engaging means forming spaced force applying surfaces to provide a mechanical couple to the camshaft,
so that when the camshaft is restrained against rotation and said driving head is slowly rotated, the fingers will rotate until the leading finger engages and pivots away from the key and the trailing finger then abuts the key, whereafter the key is snugly engaged therebetween, whereby the camshaft is oriented in a predetermined angular position with respect to said driving head.

4. In an automatic grinding machine for grinding axially spaced cam lobes of an automotive camshaft, the camshaft having a projecting indexing element or key, the machine including a base, a grinding wheel support on said base, a grinding wheel rotatably mounted on said wheel support, a work support comprising a carriage slidably mounted on said base, a rocking work cradle pivotably mounted to said carriage, a headstock and a tailstock on said cradle for rotatably supporting a camshaft, a master cam on said headstock having cam contours for each cam lobe on the camshaft, a master cam follower, a pair of work rests which are secured to said cradle to support two spaced bearing diameters on the camshaft, the improvement comprising:
a work driver which includes,
a floating driving block having opposed work engaging surfaces,
means for hingedly mounting said work driver so that the work engaging surfaces adjust to variances in the periphery of the workpiece,
said floating driving block further including indexing means for enabling a camshaft to be automatically loaded in a random angularly oriented position,
said indexing means also forming one driving surface against said key and one of said work driver surfaces forming another driving surface against the camshaft periphery to provide a mechanical couple;
an automatic work loader for transferring unground camshafts to said work rests;
means for shifting the work center of the tailstock longitudinally to move the camshaft axially into driving engagement with said work driver and said headstock work center; and
means for restraining rotation of said camshaft and simultaneously slowly rotating the work driver to orient the camshaft in said indexing means relative to said master cam.

5. A work holding device for transmitting a torque to a workpiece having a projection or key which comprises:
a driving head having a pair of spaced protruding pins extending therefrom;
a link pivotally mounted on each of said pins,
said links extending in generally parallel directions, and having studs extending from the free end thereof;
a floating member secured between said studs for limited radial movement about said pins;
a finger pivotally mounted on each of said studs,
the ends of said fingers being held apart a distance substantially equal to the width of the projection when the fingers are co-axially aligned toward each other about the studs by said floating member;
means for resiliently urging said fingers into co-axial alignment to engage the workpiece projection on two sides;
means on said floating member for engaging opposite sides of the workpiece to position the floating member concentrically with the periphery of the workpiece, one of said fingers and one of said engaging means forming spaced force applying surfaces to provide a mechanical couple to the workpiece, so that when the workpiece is restrained against rotation and said driving head is slowly rotated, the fingers will rotate until the leading finger engages and pivots away from the workpiece projection and the trailing finger then abuts the projection, whereafter the projection is snugly engaged therebetween, whereby the workpiece is oriented in a predetermined angular position with respect to said driving head.

* * * * *